(12) United States Patent
Kuge et al.

(10) Patent No.: US 8,379,234 B2
(45) Date of Patent: Feb. 19, 2013

(54) DOCUMENT DATA AND RECOMMENDED INFORMATION PROCESSING APPARATUS, DOCUMENT DATA AND RECOMMENDED INFORMATION PROCESSING SYSTEM AND RECORDING MEDIUM

(75) Inventors: Takanobu Kuge, Itami (JP); Kazuo Matoba, Akashi (JP); Hirokazu Yamada, Kobe (JP); Atsushi Ohshima, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1181 days.

(21) Appl. No.: 11/802,809

(22) Filed: May 25, 2007

(65) Prior Publication Data

US 2008/0212121 A1 Sep. 4, 2008

(30) Foreign Application Priority Data

May 30, 2006 (JP) .................. 2006-150729

(51) Int. Cl.
*G06F 3/12* (2006.01)
*G06K 15/00* (2006.01)
(52) U.S. Cl. ............. 358/1.13; 358/1.14; 358/1.15
(58) Field of Classification Search ............... None
See application file for complete search history.

(56) References Cited

U.S. PATENT DOCUMENTS

| | | | |
|---|---|---|---|
| 5,287,194 A * | 2/1994 | Lobiondo | 358/296 |
| 6,369,811 B1 | 4/2002 | Graham et al. | |
| 6,582,475 B2 | 6/2003 | Graham et al. | |
| 6,615,372 B1 * | 9/2003 | Wang | 714/46 |
| 2002/0054301 A1 * | 5/2002 | Iwai et al. | 358/1.2 |
| 2002/0109870 A1 * | 8/2002 | Moore et al. | 358/504 |
| 2003/0184798 A1 * | 10/2003 | Enomoto et al. | 358/1.15 |
| 2004/0090644 A1 | 5/2004 | Nishikawa | |
| 2004/0156056 A1 * | 8/2004 | Sawada | 358/1.2 |
| 2006/0023230 A1 * | 2/2006 | Nakata | 358/1.6 |
| 2006/0232836 A1 * | 10/2006 | Yamada et al. | 358/527 |
| 2007/0277097 A1 * | 11/2007 | Hennum et al. | 715/524 |

FOREIGN PATENT DOCUMENTS

| | | |
|---|---|---|
| JP | 08-195867 | 7/1996 |
| JP | 10-083263 | 3/1998 |
| JP | 2000-90118 A | 3/2000 |
| JP | 2000-90119 A | 3/2000 |
| JP | 2001-184184 | 7/2001 |
| JP | 2004-164106 A | 6/2004 |
| JP | 2004-184729 | 7/2004 |
| JP | 2005-10482 A | 1/2005 |

OTHER PUBLICATIONS

Notification of Reasons for Refusal in JP 2006-150729 dated May 7, 2008, and English Translation thereof.
Final Notification of Reasons for Refusal in JP 2006-150729 dated Sep. 16, 2008, and English Translation thereof.

* cited by examiner

*Primary Examiner* — Vincent Rudolph
(74) *Attorney, Agent, or Firm* — Buchanan Ingersoll & Rooney, P.C.

(57) ABSTRACT

A document data processing apparatus comprising: an obtaining portion for obtaining transmitted document data; a giving portion for giving the obtained document data multiple pieces of recommended information to recommend an operation when outputting; and a transmitting portion for transmitting document data to a destination, the document data carrying multiple pieces of given recommended information.

18 Claims, 12 Drawing Sheets

Printing Condition Setting

1. Colors/Monochrome         : Colors

2. Double-side print         : OFF

3. N in1 page                : 2 in 1 (the present and the next pages)

4. Confidential print        : ON

5. Password for confidential print: abc123de

6. Image quality mode        : Picture quality

7. Texture mode              : Glossy

| Determine |

FIG.7

Recommended Mode Name Entry Screen ⌐11 S307, S319

Please enter a recommended mode name(print method).
[ ]⟩11a
1. Print cover
2. Print summary
3. Print highlight
[Determine]

FIG.8A

Recommended Mode Name Entry Screen ⌐11 S307, S319

Please enter a recommended mode name(print method).
[ ]⟩11a
3. Print highlight [↑]
4. Print Image(map) [↓]
5. Print Chapter 1
[Determine]

FIG.8B

Comment and Priority Level Entry Screen 11 S308 S309 S320

Please enter a comment if needed.
Recommended mode name(print method):
Print cover
[ ]⟩11a
Please enter a priority level.
[ ]
[Determine]

Please enter a comment if needed.
Recommended mode name(print method):
Print cover
[ ]⟩11a
1. Print cover
  【Please comfirm as soon as possible】 [↑]
2. Print summary
  【MFP Market Research】 [↓]
3. Print highlight
  【MFP Market Research】 [Determine]

FIG.8D

Number of Printing Times Setting Screen 11 S310,S321

You can set the number of printing times if needed.
Please enter a number.
(if no number entered, no limit set to the number of printing times)
[ ]⟩11a
[Determine]

FIG.8E

Security Setting Screen 11 ⌐11 S311,S322

Please set security if needed.
[ ]⟩11a
1. Personal authentication [↑]
2. Limit apparatus
3. Limit address [↓]
[Determine]

FIG.8F

| | |
|---|---|
| (1) | Document file name |
| (2) | Recommended mode name (print mode) |
| (3) | Comment |
| (4) | Printing instruction information -1 |
|  | Printing instruction information -2 |
|  | Printing instruction information -3 |
| (5) | Printing range information -1 |
|  | Printing range information -2 |
|  | Printing range information -3 |
| (6) | Supplementary information -1 (priority level) |
|  | Supplementary information -2 (the number of printing times) |
|  | Supplementary information -3 (security) |
| (2) | Recommended mode name (print mode) |
| (3) | Comment |
| (4) | Printing instruction information -1 |
|  | Printing instruction information -2 |
|  | Printing instruction information -3 |
| (5) | Printing range information -1 |
|  | Printing range information -2 |
|  | Printing range information -3 |
| (6) | Supplementary information -1 (priority level) |
|  | Supplementary information -2 (the number of printing times) |
|  | Supplementary information -3 (security) |
|  | ⋮ |

FIG.10

| | | |
|---|---|---|
| | (1) | ***.xls |
| 20 { | (2) | Print cover |
| | (3) | Please comfirm as soon as possible |
| | (4) | Colors、Double-side、2in1 ・・・ |
| | (5) | __1__ |
| | (6) | |
| 20 { | (2) | Print summary |
| | (3) | MFP Market Research |
| | (4) | Monochrome、Single-side ・・・ |
| | (5) | __1__<br>2__2__<br>4__5__6__7__8__9<br>10__the first__11__exactly it is. |
| | (6) | N=2 |
| 20 { | (2) | Print external view |
| | (3) | Model name、*** |
| | (4) | Colors、Double-side ・・・ |
| | (5) | 10__10,10__10,100__100,100__100,10<br>11__10,10__10,100__100,100__100,10 |
| | (6) | |

FIG.11

Recommended Information — 11
Selection   S22 S23

Please select a print mode from those below.
Please press the "determine" button
after selection, then the file will be printed.

1. Print cover
   [Please comfirm as soon as possible]
2. Print summary [MFP Market Research]
3. Print highlight [MFP Market Research]
4. Print image [3F layout]
5. Print Chapter 1
   [Actions for RoHS regulations]

[Cancel]

[Display] [Print] [Print overall document]

FIG. 14A

Display Mode Selection — 11 S27

Please select a display mode from those below.
Please press the "determine" button
after selection.

1. Display overall document-Change color of document text
2. Display overall document-Mark print range
3. Display print range only
4. Display print range-Display thumbnailed image only
5. Display pages to be printed-Display page headers only

[Determine]

FIG. 14B

Printing Mode Selection — 11 S31

Please select a print mode from those below.
Please press the "determine" button
after selection.

1. Print overall document
2. Print multiple pages on one sheet
3. Print thumbnailed image
4. Print enlarged image (adjusted to sheet)

[Determine]

FIG. 14C

Post-printing process — 11 S40

You can select a post-printing process
if needed.
Please press the "determine" button
after selection.

1. Store all
2. Store file only
3. Store data except for the printed data
4. Store recmmended information only
5. Delete all

[Determine]

FIG. 14D

DOCUMENT DATA AND RECOMMENDED INFORMATION PROCESSING APPARATUS, DOCUMENT DATA AND RECOMMENDED INFORMATION PROCESSING SYSTEM AND RECORDING MEDIUM

This application claims priority under 35 U.S.C. §119 to Japanese Patent Application No. 2006-150729 filed on May 30, 2006, the entire disclosure of which is incorporated herein by reference in its entirety.

BACKGROUND OF THE INVENTION

1. Field of the Invention

The present invention relates to a document data processing apparatus that is applied to an image forming apparatus and others having a document data sending or receiving function, a document data processing system, and a recording medium having therein a recorded document data processing program to make a computer execute a predetermined document data process.

2. Description of the Related Art

The following description sets forth the inventor's knowledge of related art and problems therein and should not be construed as an admission of knowledge in the prior art.

In companies and other places, large amount of document data, etc. are distributed between users on a daily basis. And depending on a type, content, etc. of document data to be transmitted, a sender sometimes would like a recipient to display or print it in a mode that the sender himself/herself intends. For example, the sender would like an important point (a portion to be noted) within the document data, to be printed or displayed outstandingly. Therefore, it would be convenient if an intention of the sender, which is how the document data to be printed or displayed, could be effectively communicated to the recipient.

According to an art disclosed in Japanese Unexamined Laid-Open Patent Publications No. 2000-90118 and No. 2000-90119, a user enters an interest concept, then document data is analyzed to detect the location of the related description, so that the concept can be reflected in printing.

Further, according to an art disclosed in Japanese Unexamined Laid-Open Patent Publication No. 2004-164106, an instruction to print one document is given according to one despool table, then the document is printed switching the mode to colors/monochrome by pages.

However, according to the arts disclosed in the Japanese Laid-Open Patent Publications No. 2000-90118 and No. 2000-90119, who enters an interest concept and who obtains an output that reflects the concept are the same user. Meanwhile, there are more than one persons involved in the case where a sender transmits document data to a recipient and the recipient displays or prints the document data, and the sender and the recipient sometimes have different needs in how the document data to be printed or displayed. Therefore, the arts above, in which who enters a concept and who obtains an output are the same user, cannot be applied to the case.

For example, the recipient does not always have a color printer even if the sender sets a color print instruction. Thus, there possibly happens that the recipient cannot follow a print instruction set by the sender due to a certain condition on recipient side.

In another example, the recipient would like to print only a summary page from a reason such as no time to lose, even if the sender sets a print instruction to pick and print only an important chapter. Thus, there possibly happens that the recipient would not like to follow a print instruction set by the sender due to a certain condition on recipient side. In this case, it is inconvenient that a print instruction should be set again for printing, on recipient side.

Further, according to the art disclosed in the Japanese Unexamined Laid-Open Patent Publication No. 2004-164106, one print instruction can be set for one document. However, it is an issue that the sender cannot set a plurality of print instructions so that the recipient can select one that meets his/her need from those.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

An object of the present invention is to provide a document data processing apparatus that not only enables an intention of a sender to be reflected in how document data to be displayed, printed, etc., but also enables a recipient to display or print it in a mode that meets a need or condition of the recipient.

Another object of the present invention is to provide a document data processing system that not only enables an intention of a sender to be reflected in how document data to be displayed, printed, etc., but also enables a recipient to display or print it in a mode that meets a need or condition of the recipient.

Still another object of the present invention is to provide a recording medium having therein a recorded document data processing program to make a computer execute a document data process in the document data processing apparatus.

According to a first aspect of the present invention, a document data processing apparatus comprises:
  an obtaining portion for obtaining transmitted document data;
  a giving portion for giving the obtained document data multiple pieces of recommended information to recommend an operation when outputting; and
  a transmitting portion for transmitting document data to a destination, the document data carrying multiple pieces of given recommended information.

According to a second aspect of the present invention, a document data processing apparatus comprises:
  a receiving portion for receiving document data given multiple pieces of recommended information to recommend an operation when outputting;
  a selecting portion for selecting desired recommended information from among multiple pieces of recommended information given to the received document data;
  an outputting portion for outputting the received document data; and
  a controlling portion for controlling output of the outputting portion based on selected recommended information.

According to a third aspect of the present invention, a document data processing system comprises:

a document data processing apparatus on sender side which comprises:

an obtaining portion for obtaining transmitted document data;

a giving portion for giving the obtained document data multiple pieces of recommended information to recommend an operation when outputting; and a transmitting portion for transmitting document data to a destination, the document data carrying multiple pieces of given recommended information, and a document data processing apparatus on recipient side which comprises:

a receiving portion for receiving document data given multiple pieces of recommended information to recommend an operation when outputting;

a selecting portion for selecting desired recommended information from among multiple pieces of recommended information given to the received document data;

an outputting portion for outputting the received document data; and a controlling portion for controlling document data to a destination, the document data carrying multiple pieces of given recommended information.

According to a fourth aspect of the present invention, a computer program is embodied in a computer readable medium for performing the steps of:

obtaining transmitted document data;

giving the obtained document data multiple pieces of recommended information to recommend an operation when outputting; and transmitting document data to a destination, the document data carrying multiple pieces of given recommended information.

According to a fifth aspect of the present invention, a computer program is embodied in a computer readable medium for performing the steps of:

receiving document data given multiple pieces of recommended information to recommend an operation when outputting;

selecting desired recommended information from among multiple pieces of recommended information given to the received document data;

outputting the received document data; and controlling document data to a destination, the document data carrying multiple pieces of given recommended information.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 7 is a diagram showing a printing conditions setting screen;

FIGS. 8A through 8F show a screen to set a recommended mode and other screens for entry and setting;

FIG. 10 is a diagram showing a data structure of recommended information to be given to document data, and it is an independent file from the document data;

FIG. 11 is a diagram showing a specific example of the data structure shown in FIG. 10;

FIGS. 14A through 14D show various screens displayed on a display of a document data processing apparatus on recipient side.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
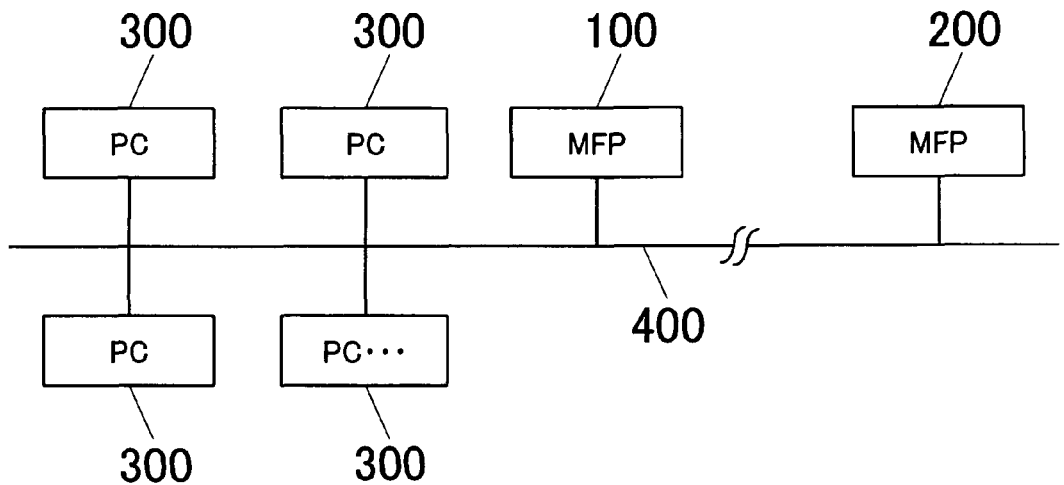
FIG. 1 is a block diagram showing a document data processing system according to one embodiment of the present invention.

FIG. 1 is a block diagram showing an overall configuration of a document data processing system according to one embodiment of the present invention.

In the document data processing system, a plurality of document data processing apparatuses 100 and 200, and a plurality of personal computers (hereinafter to be referred to as "PC") 300 are connected via a network 400, and these respective document data processing apparatuses 100 and 200, and PCs 300 can mutually exchange document data and other data via the network 400.

In this embodiment, a MFP (Multi Function Peripheral) that is a multi-functional image forming apparatus having functions such as copy, print, facsimile and scan, is used as the document data processing apparatuses 100 and 200.

Figure 2:
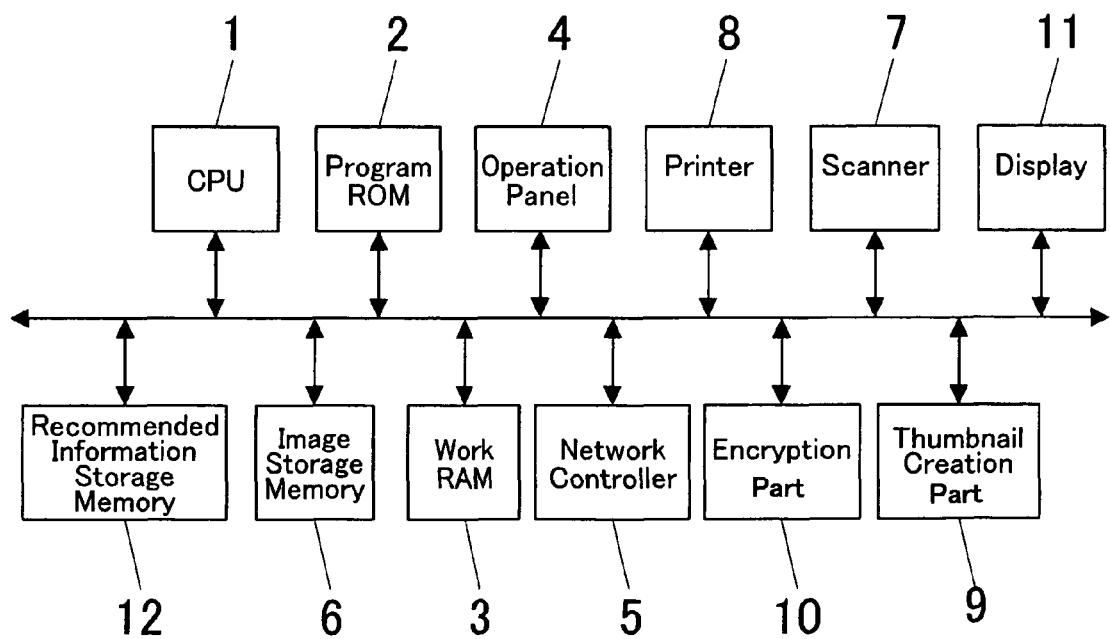
FIG. 2 is a block diagram showing a configuration of a document data processing apparatus that is used in the system shown in FIG. 1.

FIG. 2 is a block diagram showing an internal configuration of the document data processing apparatuses 100 and 200.

As shown in FIG. 2, each of the document data processing apparatuses 100 and 200 comprises a CPU 1, a program ROM 2, a work RAM 3, an operation panel 4, a network controller 5, an image storage memory 6, a scanner 7, a printer 8, a thumbnail creation part 9, an encryption part 10, a display 11, and a recommended information storage memory 12.

The CPU 1 serves to control the overall document data processing apparatus 100 or 200, and the program ROM 2 has a recorded program that is activated by the CPU 1. The work RAM 3 provides working area for the CPU 1 to perform operations according to a program recorded in the program ROM 2.

The operation panel 4 is for a user to enter various instructions and data, such as mode setting, destination setting, and entry/selection of recommended information, and comprises key entry parts such as a numeric key pad, a start key and a stop key, and a touch panel provided to the screen of the display 11.

The network controller 5 functions as an interface to exchange document data and others with the other document data processing apparatus, the PCs, and others, via the network 400.

The image storage memory 6 stores document data including image data of a document read by the scanner 7, document data transmitted from the PC 300 and the other document data processing apparatus, and other document data.

The scanner 7 serves to scan a document and convert it into image data, and the printer 8 prints document data provided by the scanner 7, document data transmitted by the PCs or the other document data processing apparatus, and others.

The thumbnail creation part 9 creates a thumbnail of document data and others read out from a document by the scanner 7, and the encryption part 10 encrypts document data and others.

The display 11 comprises a liquid crystal panel with a touch switch for example, and displays status of the document data processing apparatus 100 or 200, set modes, recommended information and others.

The recommended information storage memory 12 has recommended mode names (to be described below) stored separately from document data, and the recommended mode names are just a part of recommended information.

The recommended information is information to recommend an operation when outputting, which is for example, information to recommend an operation to print the document data by the printer 8, or to display the document data by the display 11.

Hereinafter, it will be explained as an example, how document data that is image data readout by the scanner 7 is transmitted by the document data processing apparatus 100 on sender side, to the document data processing apparatus 200 on recipient side.

Figure 3:
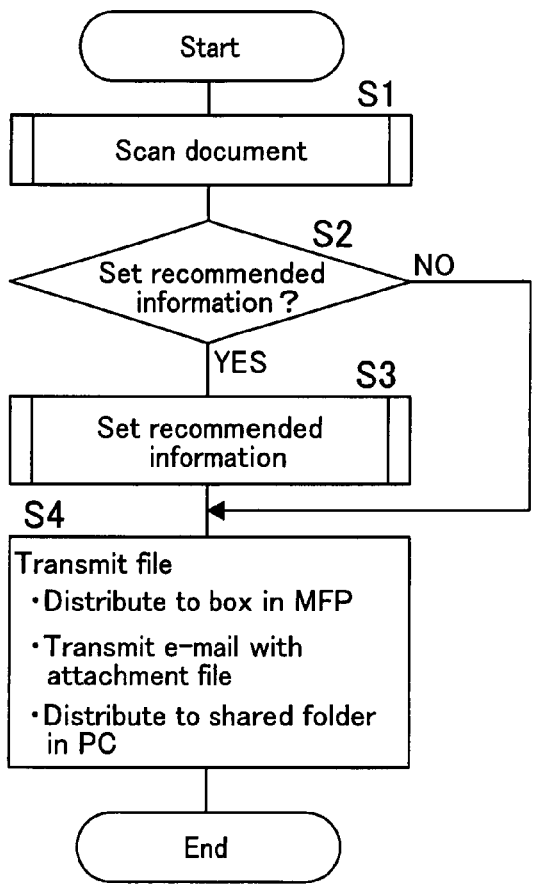
FIG. 3 is a flowchart showing processes executed in a document data processing apparatus 100 on sender side.

FIG. 3 is a flowchart showing processes executed in the document data processing apparatus 100 on sender side. The processes are executed by the CPU 1 according to a program recorded in the ROM 2. This embodiment is explained with a case where document data is acquired by reading a document by the scanner 7. However, another case where data is preliminarily recorded in a box or other that is recording area capable of recording data in segments and document data is acquired by calling recorded data, is also applicable.

First, a document is scanned by the scanner 7 according to an instruction entered by a sender, in Step S1.

Subsequently, as shown in a screen (A) in FIG. 6, a screen to inquire whether or not recommended information should be set is displayed on the display 11. Meanwhile, as shown in FIG. 6 and the following Figures, corresponding Step numbers in the flowcharts in FIG. 3 to FIG. 6, are given in the upper and right region of the screens, respectively.

Figure 6:
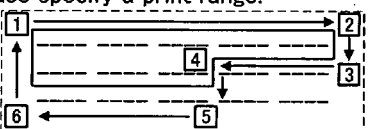
FIGS. 6A through 6H show a screen to set a print range and other screens for setting.

In Step S2 shown in FIG. 3, it is judged whether or not recommended information should be set, based on an instruction entered by a user (a "yes" button or a "no" button pressed in the screen (A) shown in FIG. 6). If recommended information should be set (YES in Step S2), a process to set recommended information is performed in Step S3. More specifically, recommended information is given to image data of a document read by the scanner 7 in the process. Then, the routine proceeds to Step S4. If recommended information should not be set (NO in Step S2), the routine directly proceeds to Step S4.

In Step S4, document data carrying or not carrying given recommended information, is transmitted to the destination. In this embodiment, it is transmitted to a box in the document data processing apparatus 200 that is a MFP. However, it also can be transmitted to the PC or other as an e-mail attachment file, also can be transmitted to a shared folder in the PC or other, and otherwise also can be transmitted to a plurality of recipients, which is a multi-address transmission.

Figure 4:
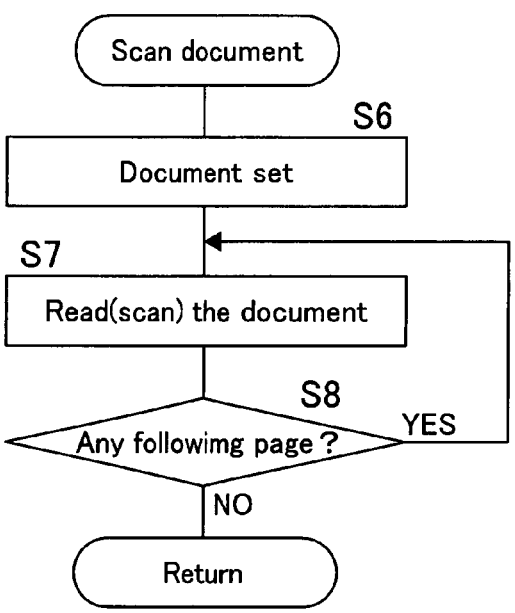
FIG. 4 is a flowchart showing a subroutine for a document scanning process in Step S1 in the flowchart shown in FIG. 3.

FIG. 4 is a flowchart showing a subroutine of a document scanning process in Step S1 in the flowchart shown in FIG. 3.

In FIG. 4, if it is detected in Step S6 that a document is set, image of the document is read in Step S7 according to a user instruction. Image data read out from the document is recorded in the work RAM 3. In Step S8, it is judged whether or not there is any following document (following page), and if there is any following document (YES in Step S8), the routine goes back to Step S7 to continue reading image until there is no following document. If there is no following document (NO in Step S8), the routine directly returns.

Figure 5:
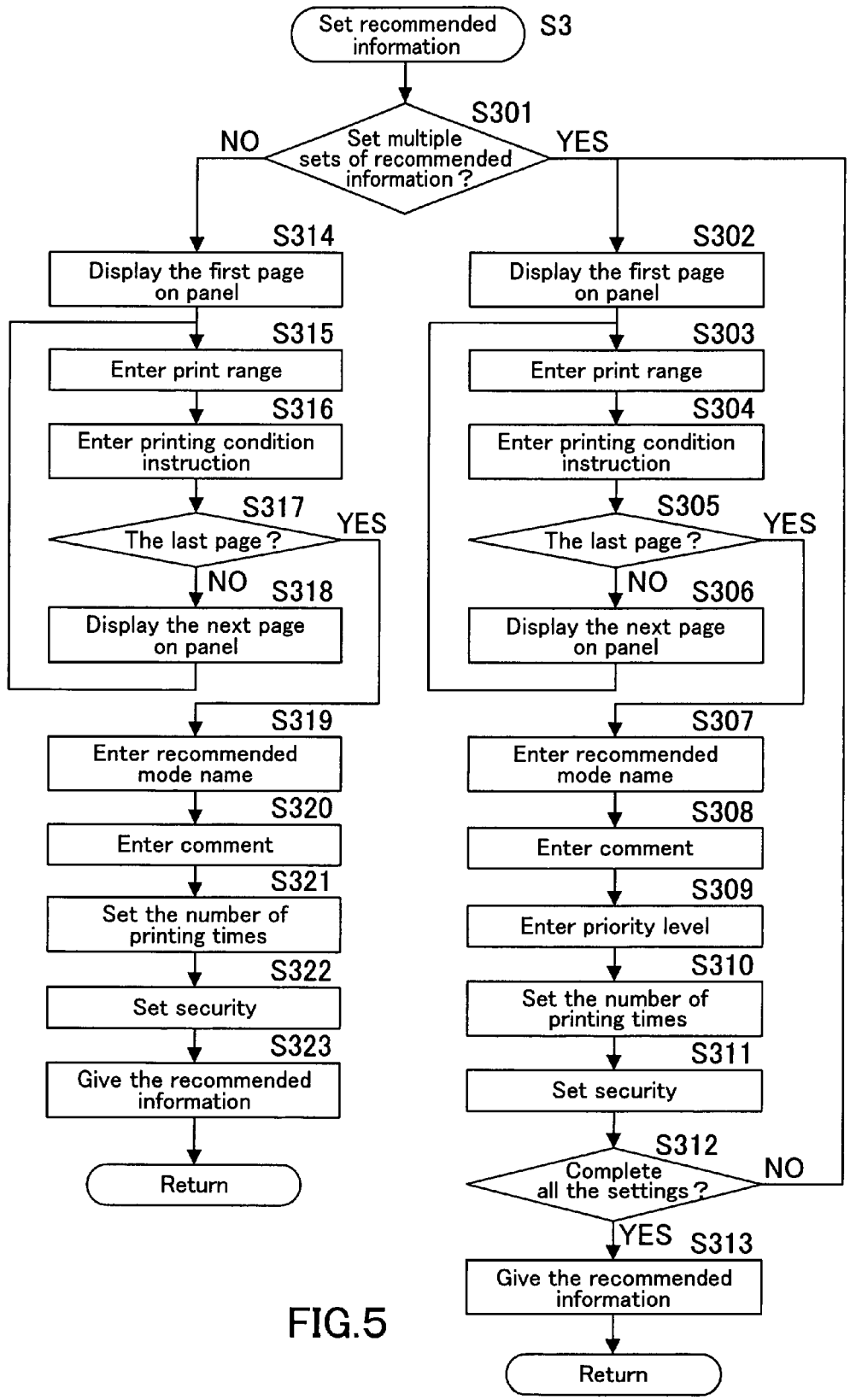
FIG. 5 is a flowchart showing a subroutine for a recommended information setting process in Step S3 in FIG. 3.

FIG. 5 is a flowchart showing a subroutine of a recommended information setting process in Step S3 in FIG. 3. This embodiment is explained with a case where the recommended information includes two instructions: a print range instruction and a printing condition instruction. As for the printing condition instruction, there are conditions to be set by pages, and those to be set in recommended modes such as number of printing times and security.

In Step S301, it is judged whether or not a plurality of sets of recommended information should be set, and if not a plurality of sets should be set (NO in Step S301), the routine proceeds to Step S314. If a plurality of sets should be set (YES in Step S301), the routine proceeds to Step S302.

In Step S302, the first page of the document data readout from the document is displayed on the operation panel of the display 11. The screen displayed here is shown as (B) in FIG. 6. The display 11 displays thumbnail image of the first page of the read document, as well as a message to encourage to set a print range and the respective buttons of "enlarge", "reduce", "colors" and "determine". The "enlarge" button and the "reduce" button are used to enlarge/reduce the displayed thumbnail image, the "colors" button is used to display the thumbnail image in colors, and the "determine" button is used to determine the selected settings. Meanwhile, thumbnail image of the document data is created by the thumbnail creation part 9.

If a sender specifies a range via the screen by finger as indicated by numbers enclosed by squares and arrows in FIG. 6(C), then a frame is shown to indicate the specified range. And then a print range is set by pressing the "determine" button. Thus, information inside (or outside) of print range is specified, and only the specified part is preferentially outputted (printed or displayed). In addition, a plurality of ranges per page also can be specified as shown in FIG. 6(D). By specifying a plurality of ranges, target parts to be outputted can be picked up collectively.

As shown in FIG. 6(E), a print range also can be set by specifying a page header. As shown in this screen, a "page header" button is prepared, and by pressing the "page header" button, the first line of the page is automatically specified. In addition to the first line, an end line of the range can be specified.

When a print range is set by specifying a page header, the range from the first character of the first line through the first punctuation is specified, as shown in FIG. 6(F). An end punctuation of the range can be specified by punctuation number.

As shown in FIG. 6(G), a print range can be set by specifying a line. As shown in this screen, a "line" button is prepared. A line is specified by pressing the button and selecting a line header via the screen. A line also can be specified by line number. If the sentence exceeds one line, the whole sentence (through the end punctuation of the sentence), not only one line, can be specified.

As shown in FIG. 6(H), only images in document data can be specified. As shown in this screen, an "image" button is prepared. Only the images are picked up and set as a print range by pressing the button.

Although illustration is omitted here, when specifying whole page(s), page(s) can be specified by page number such as 1, 2, 5-9, and 15, or a range between chapter headers can be specified by chapter numbers. For example, if "Chapter 1" is entered, a range just before the letters "Chapter 2" is specified. Meanwhile, a common setting can be given to pages. For example, if "Line setting: 3" is entered, a range from the page top to the third line is specified commonly for all the pages, or that range also can be specified commonly for selected pages only, not all the pages. Further, a location on print sheets, where information of the print range is outputted, can be changed. For example, image from a page can be printed on the backside of a specified page that is other than the former page.

In this way, a print range is set to the displayed document data (image data) by a sender, and it is accepted in Step S303 shown in FIG. 5.

Subsequently, a printing condition setting screen is displayed on the display 11, as shown in FIG. 7. There already entered default values in respective setting items in the screen shown in FIG. 7. A sender points the cursor to a target item to display other candidates, or performs a manual entry operation. The printing condition setting screen shown in FIG. 7 is displayed always after setting a print range in Step S303, so that the sender can enter a printing condition instruction by pages. He/she can set a printing condition by pages if a confidential document is printed. After entering about the respective items, the sender presses the "determine" button, then it is accepted in Step S304.

In Step S305, it is judged whether or not the data displayed on the display 11 is of the last page. If it is not of the last page (NO in Step S305), the next page is displayed on the display 11 in Step S306. If it is of the last page (YES in Step S305), a screen to encourage the sender to enter a recommended mode name that indicates his/her recommended print method is displayed. The sender enters a recommended mode name, then it is accepted in Step S307.

FIG. 8 shows a screen to enter a recommended mode name, which is displayed on the display 11. As shown in this screen, there is an entry field 11a with a message that encourages entering a recommended mode name. The sender directly enters a recommended mode name in the entry field 11a. Alternatively, recommended mode names such as "print cover", "print summary" and "print highlight" which are often used, are preliminarily registered in the recommended information storage memory 12, and the sender calls and display the registered recommended mode names on the display, and then enter a preferable recommended mode name by selecting one from them. The selected recommended mode names are highlighted (as marked with hatching in FIG. 8 (A)). Meanwhile, "print cover" is a mode to print only a cover page, "print summary" is a mode to print a cover page and a summary part, and "print highlight" is a mode to print a part to be noted.

If there are a number of registered recommended mode names, a up-arrow key and a down-arrow key are provided so that the screen can be scrolled, as shown in FIG. 8(B). If the sender enters a mode name manually by characters and it is a new mode name, it is registered in the recommended information storage memory 12, so that it can be displayed as a registered recommended mode name in entry screens thereafter. Alternatively, it can be inquired to the sender whether or not the recommended mode name that are manually entered should be registered.

After the recommended mode name is entered in this way above, a screen to enter a comment and a priority level is displayed on the display 11. The sender enters a comment and a priority level therein, and these are accepted in Step S308 and Step S309, respectively.

FIG. 8(C) shows a screen to enter a comment and a priority level. The sender enters a comment in the comment entry field 11a displayed in this screen. A comment is supplementarily given as information so that the recipient can know what the recommended mode name means, since he/she may not definitely understand what it means only from the name. If no comment is needed, the sender presses the "determine" button with nothing entered. In addition, comments having been entered before are accumulated in the recommended information storage memory 12, so that the registered comments are displayed for reference as shown in FIG. 8(D).

A priority level is entered to determine a listing order of a plurality of recommended information displayed on recipient side, in a screen to select recommended information. The sender can effectively communicate to the recipient which modes are more recommendable by setting priority levels when entering recommended information.

Then, a screen to enter information to limit printing document data on recipient side, is displayed on the display 11. The sender enters limit information, then it is accepted in Step S310 shown in FIG. 5.

FIG. 8(E) shows a screen to set the number of printing time that is an example of information to limit. A value is entered as the number of printing time in the entry field 11a that is displayed in the screen. If no value is entered, this means no limit. In this way, printing an original document on recipient side is limited by setting the number of printing time. As well as the number of printing times, information to limit also can be a printing due time.

Subsequently, a security setting screen is displayed on the display 11. The sender enters a security setting therein, then it is accepted in Step S311 shown in FIG. 5.

FIG. 8(F) shows a security setting screen. In this example, there are security options available: "personal authentication" to limit persons to print, "limit apparatus" to limit apparatuses such as the PC and the MFP to print, "limit IP address" to limit apparatuses to access via a network. A plurality of security options can be set. Available security options are not limited to those mentioned above.

Security options can be set in this way, which highly ensures files, and is advantageous specifically if a document to be transmitted contains confidential information.

Then, in Step S312 shown in FIG. 5, it is judged whether or not all the settings are completed. If all the settings are not completed (NO in Step S312), the routine goes back to Step S302, and if all the settings are completed (YES in Step S312), the routine proceeds to Step S313, where recommended information is given to the document data according to the settings, and then the routine returns.

The processes Step S314 to Step S322 in the flowchart shown in FIG. 5 are identical with those mentioned above, Steps S302 to 311. Therefore, explanation about the processes is omitted here.

After security setting in Step S322, recommended information is given to the document data according to the settings in step S323, and then the routine returns.

Figure 9A:
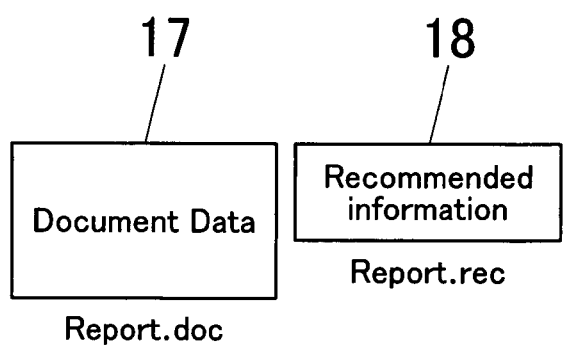
FIGS. 9A and 9B show diagrams to explain forms in which recommended information is given.
Figure 9B:
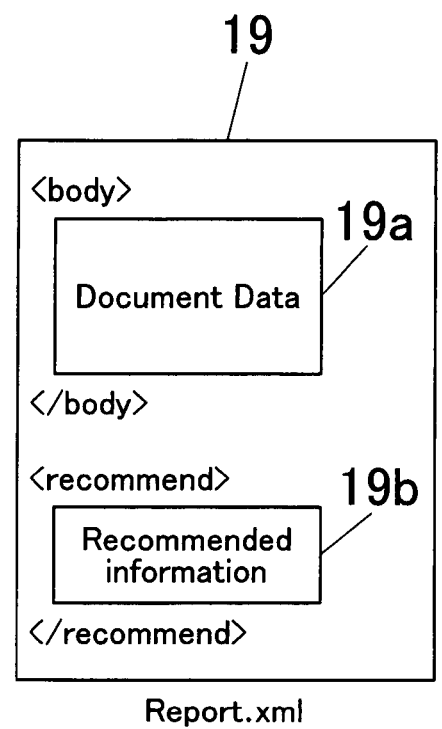

FIG. 9 shows two examples of a form in which recommended formation is given. FIG. 9(A) shows an example in which recommended information 18 with a file name "report.rec" for example, which is an independent file, is given to document data 17 with a file name "report.doc". FIG. 9(B) shows an example in which recommended information 19b is given to (embedded in) a document data file 19. In this example, document data 19a and the recommended information 19b are included in a xml file "report.xml", and start and end of the document data 19a are indicated by a "<body>" tag and a "</body>" tag, respectively. And start and end of the recommended information 19b are indicated by a "<recommend>" tag and a "</recommend>" tag, respectively.

In FIG. 9(B), recommended information is given collectively to one place. However, recommended information also can be given in parts by embedding tag information in the document data.

FIG. 10 shows an example of a data structure of recommended information to be given to document data, and it is an independent file from the document data as shown in FIG. 9(A).

There included in the data, a document file name (1), a recommended mode name (2), a comment (3), one or more than one print instruction information (4), one or more than one print range information (5), and one or more than one supplementary information (6); and recommended information 20 having the recommended mode name (2), the comment (3), the print instruction information (4), the print range information (5) and the supplementary information (6) that are collected all in one set. The data includes one or more than one sets of the recommended information 20 according to setting by the sender.

As the document file name, a file name of the corresponding document data is employed. The recommended mode name is "print cover" "print summary" "print highlight", or other that is set by the sender in Step S307 or S320 shown in FIG. 5. The comment is "please confirm as soon as possible" "market research results" or other that is a comment to explain the recommended mode name and is set in Step S308 or S320 shown in FIG. 5, which helps selecting which to be printed. The print instruction information is a printing condition that is set by the sender in Step S304 or S31 shown in FIG. 5. The print range information is a print range that is set by the sender in Step S303 or S315 shown in FIG. 5. The print range can be set by specifying a start position and an end position of characters, or can be set by specifying location dimensions.

The supplementary information is the number of printing times, security, a priority level, and others that are set by the sender in Steps S309 to S311 or Steps S321 to S322 shown in FIG. 5. If nothing is set, the supplementary information is omitted.

FIG. 11 shows a concrete example of the data structure shown in FIG. 9. Numbers in parentheses, which are shown to the left of the data field, correspond to the numbers in parentheses shown in FIG. 9. In this example, there given three sets of the recommended information 20, a first to a third from the top.

According to the first recommended information, the recommended mode name for printing is "print cover" the comment is "please confirm as soon as possible" the print instruction is "colors, double-side, 2 in 1 . . . ", and the print range is "from top to end of page 1 of document file". There is no supplementary information.

According to the second recommended information, the recommended mode name for printing is "print summary", the comment is "MFP market research", the print instruction is "monochrome, single-side . . . ", the print ranges are "from top to end of page 1 of document file", "from top to end of page 2 of document file" "from $6^{th}$ character in $5^{th}$ line in page 4, to $9^{th}$ character in $8^{th}$ line in page 7" and "from 'the first' in page 10, to 'exactly it is.' in page 11". The supplementary information is "two printing times".

According to the third recommended information, the recommended mode name for printing is "print external view", the comment is "model name: ***", the print instruction is "colors, double-side . . . ", and the print range is "range enclosed by four points in page 10" and "range enclosed by four points in page 11". There is no supplementary information.

Hereinafter, processes executed in the document data processing apparatus 200 that is a destination of transmitted document data having a plurality of given recommended information, will be explained with reference to the flowchart in FIG. 12. The processes are executed by the CPU 1 or the program ROM 2 according to a program recorded therein. Here, explanation is given on the assumption that document data is already transmitted to a box in the document data processing apparatus 200.

In Step S19, a file transmitted from the document data processing apparatus 100 is received and stored in a box that is recording area, then in Step 20, the file selected by the receiver is read out from the box.

Then, it is checked in Step S21 whether or not the readout file carries given recommended information, and if it does not carry given recommended information (NO in Step S21), the routine terminates, and if it carries given recommended information (YES in Step S21), the routine proceeds to Step S22.

In Step S22, a list of a plurality of the given recommended information is displayed on the display panel of the display 11 according to the priority levels.

FIG. 14(A) shows a screen in which a list of the given recommended information is displayed. In this example, there displayed five recommended mode names "1. Print cover" to "5. Print Chapter 1" with a comment, respectively. The names are listed in order of the priority levels set in Step S309 shown in FIG. 5. After selecting preferable recommended information, the recipient presses a "display" button, a "print" button, a "print overall document" button or a "cancel" button. If the "print overall document" button is pressed, the document is printed ordinarily without relation to the recommended information.

In this way, if document data carrying a plurality of given recommended information is transmitted to a destination, it is only necessary for the sender to give to document data, recommended information that is his/her intention how the document data preferably to be displayed or printed. Thus, the intention can be reflected in how the document data is displayed and printed on recipient side. In addition, a plurality of recommended information that supposedly would meet circumstances and need of the recipient, can be sent. Thus, if document data is transmitted to a plurality of recipients, it is advantageous that recommended information is not needed to be created individually for the respective recipients.

On the other hand, it is only necessary for the receivers to select preferable recommended information from a plurality of the recommended information depending on their own circumstances and needs. Thus, the receivers can print or display document data in a mode that meets their own circumstances and needs.

In addition, recommended information is displayed by recommended mode names, and the recipient selects preferable recommended information by selecting a recommended mode name, he/she can select preferable recommended information correctly and easily. If a comment is attached to a recommended mode name, the recipient easily can understand what the recommended mode name means, and it is convenient.

Figure 12:
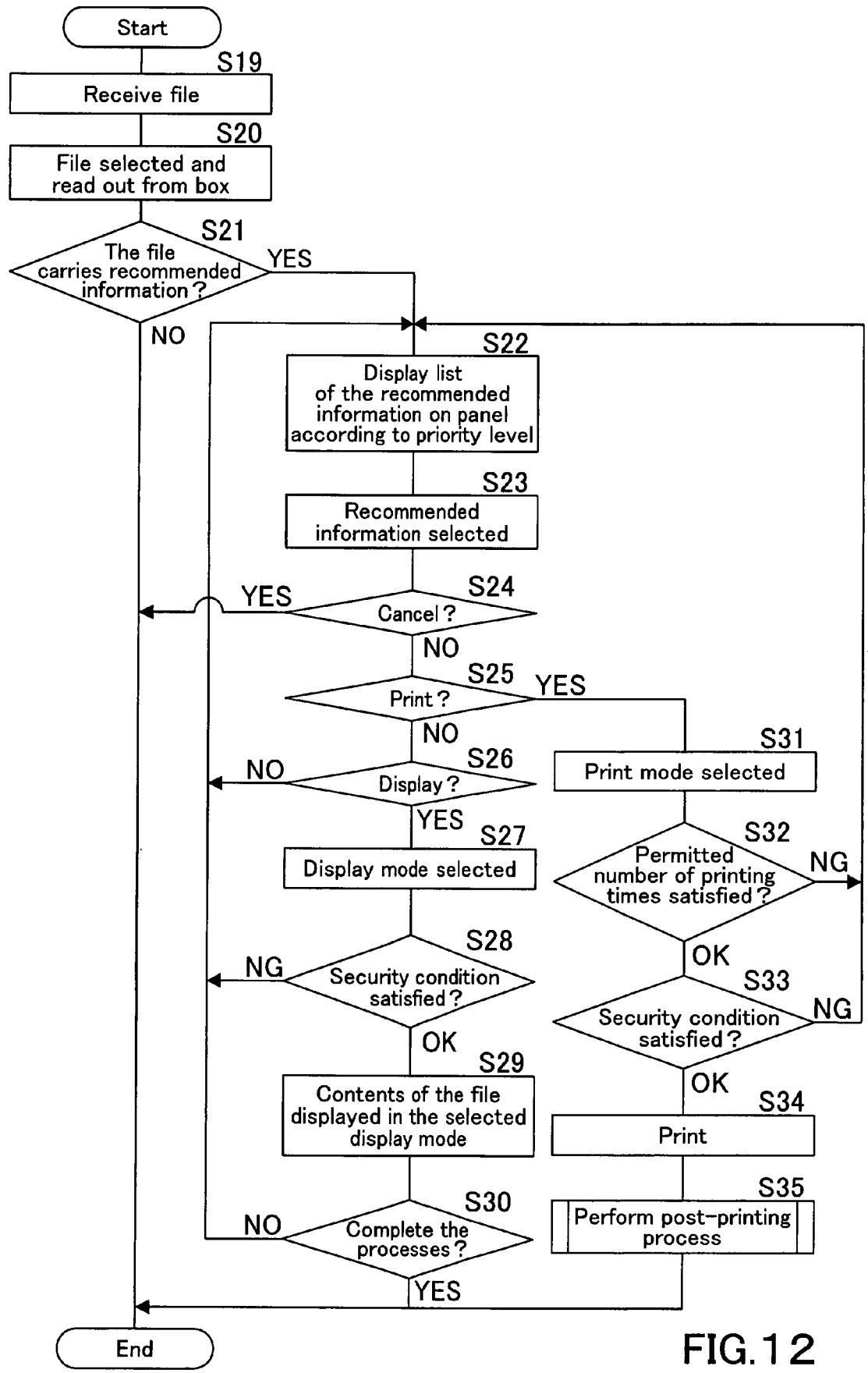
FIG. 12 is a flowchart showing processes executed in a document data processing apparatus that is a destination of transmitted document data having a plurality of given recommended information.

As shown in the flowchart in FIG. 12, recommended information selected by a user is accepted in Step S23, and it is judged whether or not the "cancel" button is pressed in Step S24. If the "cancel" button is pressed (YES in Step S24), the routine terminates. If the "cancel" button is not pressed (NO in Step S24), it is judged whether or not the "print" button is pressed in Step S25.

If the "print" button is not pressed (NO in Step S25), it is judged whether or not the "display" button is pressed in Step S26. If the "display" button is not pressed (NO in Step S26), the routine goes back to Step S22. If the "display" button is pressed (YES in Step S26), a screen to select a display mode is displayed on the display 11 and an instruction selected by the recipient is accepted, in step S27.

FIG. 14(B) shows a screen to select a display mode. In this embodiment, a plurality of display modes are prepared so that the recipient can select a preferable display mode therefrom. The document data is displayed by a selected mode by pressing the "determine" button. Meanwhile, recommended information for display modes is set just like in the case of recommended information for printing.

Subsequently, it is judged in Step S28 whether or not the security condition set by the sender is satisfied. For example, a user prohibited to print a document can be also prohibited to browse a document. When a user is successfully authorized to log in the document data processing apparatus, then it is judged whether or not the security condition set by the sender is satisfied, by comparing authentication data and the security condition.

If the security condition is not satisfied (NG in Step S28), the routine goes back to Step S22. If it is satisfied (OK in Step S28), contents of the file are displayed in the selected display mode in Step S29.

Then in Step S30, it is judged whether or not the processes are completed, and if those are completed (YES in Step S30), the routine terminates, and if those are not completed (NO in Step S30), the routine goes back to Step S22.

Meanwhile, if the "print" button is pressed in Step S25 shown in FIG. 12 (YES in Step S25), a screen to select a print mode is displayed on the display 11 and an instruction selected by the recipient is accepted in Step S31.

Then in Step S32, it is judged whether or not the condition set by the sender, which is the permitted number of printing times, is satisfied. If it is not satisfied (NO in Step S32), the routine goes back to Step S22. If it is satisfied, it is judged in Step S33 whether or not the security condition set by the sender is satisfied.

If the security condition is not satisfied (NG in Step S33), the routine goes back to Step S22. If it is satisfied (OK in Step S33), the document data is printed by the selected print mode in Step S34, and then a post-printing process is performed in Step S35.

FIG. 14(C) shows a screen to select a print mode. In the screen, a print mode is selected by the recipient depending on conditions of print range and sheets, just as a supplement for the print mode specified in the recommended information selected in the screen to select recommended information shown in FIG. 14(A). Therefore, the screen is not necessarily to be displayed.

For example, if "print cover" or "print summary" is selected in the selection screen in FIG. 14(A) and "print overall document" is selected in the selection screen in FIG. 14(C), the overall document is printed together with the print range set to "print cover" or "print summary" as is as enclosed by frame, or marked in another color or boldfaced. If "print summary" is selected in the selection screen in FIG. 14(A) and "print multiple pages on one sheet" is selected in the selection screen in FIG. 14(C), the set print ranges are printed collectively in one page. If "print image" is selected in the selection screen in FIG. 14(A) and "print thumbnailed image" or "print enlarged image" is selected in the selection screen in FIG. 14(C), thumbnailed or enlarged image is printed.

Figure 13:
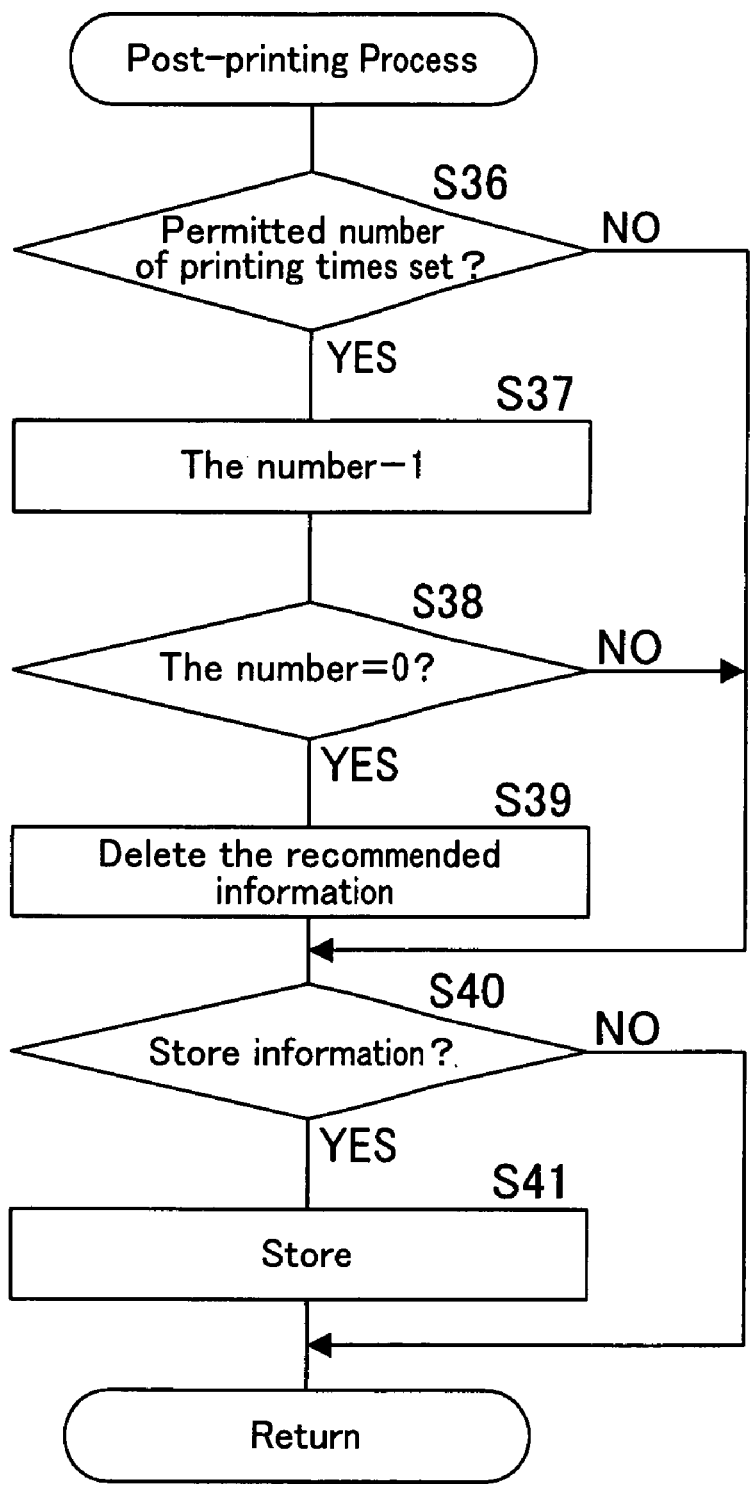
FIG. 13 is a flowchart showing a subroutine of a post-printing process in Step S35 in FIG. 12.

FIG. 13 is a flowchart showing a subroutine of the post-printing process in Step S35 shown in FIG. 12.

In Step S36, it is judged whether or not a permitted number of printing times is set by the sender, to the recommended information selected by the recipient. If it is not set (NO in Step S36), the routine proceeds to Step S40. If it is set (YES in Step S36), "1" is subtracted from the number of printing times in a table that administers the number of printing times, in Step S37. Then, it is checked in Step S38 whether or not the currently remaining permitted number of printing times, is "0".

If the currently remaining permitted number of printing times is not "0" (NO in Step S38), the routine proceeds to Step S40, and if it is "0" (YES in Step S38), the recommended information is deleted in Step S39 to prohibit any more printing, then the routine proceeds to Step 40.

In Step S40, it is judged according to an instruction given by the recipient, how the recommended information, the document data, and others that are already used, should be stored specifically, or not should be stored anyway. If an instruction to store is given (YES in Step S40), those are stored in the selected mode in Step S41. If an instruction is not given (NO in Step S40), the routine directly returns.

FIG. 14(D) shows a screen for the recipient to select an instruction how the recommended information, the document data, and others should be stored specifically, or not should be stored anyway. In this example, "store all" "store file (document data) only" ..., or "delete all" can be selected. According to an instruction selected in this screen, the judgment is performed in Step S40.

Alternatively, the sender can set whether or not to store recommended information, document data and others, or a storage mode if store, and include the settings in the recommended information. In this case, the settings have the priority.

Meanwhile, as shown in the flowchart FIG. 12, if the recipient selects a plurality of recommended information, a plurality of printing times are performed. However, if the latter selected recommended information and the former selected recommended information includes a duplicated print mode, printing can be performed in a different print mode only.

So far explained above is one embodiment of the present invention, however, the present invention is not limited to this embodiment.

For example, in this embodiment, document data carrying given recommended information is transmitted from the document data processing apparatus 100 that is an image forming apparatus, to a box in the document data processing apparatus 200 that is an image forming apparatus too. However, the document data can be transmitted (registered) from the PC to a box in the image forming apparatus.

In this case, to give recommended information, an application to give recommended information is started on the PC when document data is registered in a box. The application to give recommended information can be preliminarily installed on the PC, or can be obtained by downloading. Similarly to other cases, recommended information that is independent from document data can be given, or recommended information can be given (embedded) as supplementary information that is originally owned by document data file.

In addition, in this embodiment, document data carrying given recommended information is transmitted to a box in the image forming apparatus. As mentioned above, an e-mail having an attachment file, which is document data carrying recommended information, can be transmitted to the PC or other that is a destination. If the PC that receives the e-mail has an installed application, the contents displayed on the display 11 in the data processing apparatus 200, are also displayed on the monitor of the PC. Alternatively, it also can be transmitted to a shared folder in the PC.

In addition, after document data carrying given recommended information is transmitted, other recommended information can be additionally transmitted or the former transmitted recommended information can be updated.

Further, in this embodiment, an operation when outputting that is recommended in the recommended information is a print operation. However, it can be an operation relating to display, transmission to another destination, or other.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example" and "NB" which means "note well".

What is claimed is:

1. A document data processing apparatus comprising:
    an obtaining portion configured to receive document data;
    a display configured to display the document data;
    a user interface for receiving user input assigning recommended information for the document data, wherein the recommended information includes a plurality of alternative output conditions for manual selection;
    a transmitting portion for transmitting the document data and the recommended information to a destination for manual selection by a recipient to control output of the document data; and
    a security setting portion for defining security conditions within the recommended information that control the output of the document data.

2. The document data processing apparatus as claimed in claim 1, wherein said recommended information is stored in an independent file associated with the document data.

3. The document data processing apparatus as claimed in claim 1, wherein said recommended information is embedded with said document data.

4. The document data processing apparatus as claimed in claim 1, further comprising a storage memory for storing said recommended information in an independent file.

5. A document data processing apparatus comprising:
    a receiving portion for receiving document data and recommended information for the document data, wherein the recommended information includes a plurality of alternative output conditions for manual selection;
    a selecting portion for manually selecting desired output conditions from among the plurality of alternative output conditions in the recommended information; and
    an outputting portion for outputting said received document data according to the selected output conditions, and
    wherein the recommended information further includes security conditions which control the output of the document data.

6. The document data processing apparatus as claimed in claim 5, wherein said recommended information is stored in an independent file associated with said document data.

7. The document data processing apparatus as claimed in claim 5, wherein said recommended information is embedded with said document data.

8. The document data processing apparatus as claimed in claim 5, wherein said recommended information includes a recommended mode name that is manually selectable by a recipient.

9. The document data processing apparatus as claimed in claim 5, wherein said recommended information contains comments that indicate output conditions associated with the recommended mode name.

10. A document data processing system comprising:
    a document data processing apparatus on a sender side which comprises:
    an obtaining portion configured to receive document data;
    a display configured to display the document data;
    a user interface for receiving user input assigning recommended information for the document data, wherein the recommended information includes a plurality of alternative output conditions for manual selection; and a transmitting portion for transmitting the document data and the recommended information to a destination, and a document data processing apparatus on a recipient side which comprises:

a receiving portion for receiving the document data and the recommended information;

a selecting portion for manually selecting desired output conditions from among the plurality of alternative output conditions in the recommended information; and an outputting portion for outputting said received document data according to the selected output conditions, and wherein a document data processing apparatus on the sender side further comprises a security setting portion for defining security conditions within the recommended information that control the output of the document data.

11. The document data processing system as claimed in claim 10, wherein said recommended information is stored in an independent file associated with said document data.

12. The document data processing system as claimed in claim 10, wherein said recommended information is embedded with said document data.

13. The document data processing system as claimed in claim 10, wherein a document data processing apparatus on the sender side further comprises a storage memory for storing said recommended information in an independent file.

14. The document data processing system as claimed in claim 10, wherein said recommended information includes a recommended mode name that is manually selectable by a recipient.

15. The document data processing system as claimed in claim 14, wherein said recommended information contains comments that indicate output conditions associated with the recommended mode name.

16. The document data processing system as claimed in claim 10, wherein the recommended information includes security conditions which control the output of the document data.

17. A computer program embodied in a non-transitory computer readable medium for performing the steps of:

receiving document data;

assigning recommended information for the document data, wherein the recommended information includes a plurality of alternative output conditions for manual selection;

defining security conditions within the recommended information that control the output of the document data; and transmitting the document data and the recommended information to a destination for manual selection by a recipient to control output of the document data.

18. A computer program embodied in a non-transitory computer readable medium for performing the steps of:

receiving document data and recommended information for the document data, wherein the recommended information includes a plurality of alternative output conditions for manual selection;

receiving a manual selection of desired output conditions from among the plurality of alternative output conditions in the recommended information;

outputting the document data according to the selected output conditions, and wherein the recommended information further includes security conditions which control the output of the document data.

* * * * *